United States Patent Office 3,322,938
Patented May 30, 1967

3,322,938
AUTOMATIC CONTROL SYSTEMS FOR OPTIMIZING HEAT TRANSFER TO A FLUID FLOWING THROUGH PARALLEL CONNECTED HEAT EXCHANGERS
Eric A. Weiss, Springfield, Pa., assignor to Sun Oil Company, Philadelphia, Pa., a corporation of New Jersey
Filed Feb. 15, 1963, Ser. No. 258,843
7 Claims. (Cl. 235—150.1)

This invention relates to automatic control systems, and more particularly to methods and apparatus for optimizing or maximizing the total heat transferred to a fluid flowing through parallel-connected heat exchangers. The optimizing is effected automatically and continuously.

It is common practice, particularly in petroleum refining, to use heat exchangers connected in parallel with each other. That is to say, a single stream of fluid is divided into two or more branches, following which division each branch is passed through a separate heat exchanger, and thereafter the streams are recombined into a single stream. The other sides of such parallel-connected exchangers may or may not be operated in parallel with each other. With parallel-connected operation, there arises the problem of selecting and maintaining the optimum division of flow among the several exchangers, so as to obtain the maximum heat transfer to the fluid, which is equivalent to achieving the maximum temperature of the final recombined stream. The problem of maintaining the "best" or optimum division of flow is not simply one of maintaining a constant flow, or even a constant flow ratio, since variations in total fluid flow, variations in fluid composition, variations in the flow and composition of the fluids on the other sides of the exchangers, and variations in the fouling and corrosion of the exchangers themselves will require changes in the flow division, if the best possible heat transfer is to be maintained in spite of all such variations.

The economic gains from continuous optimization of heat transfer are particularly large in situations where very large flows are passing through a set of parallel-connected heat exchangers. For example, a crude oil heat exchange network which is transferring 80 million B.t.u./hr. and which is only 5% off optimum costs its operator about $15,000 per year in extra fuel cost to heat the crude oil; this extra fuel cost could be entirely eliminated if the heat exchange network were optimized.

An object of this invention is to provide a novel automatic control system.

Another object is to provide an automatic control system for continuously optimizing the division of fluid flow between two or more parallel-connected heat exchangers.

A further object is to provide a method and apparatus for maximizing the total heat transferred to a fluid flowing through two parallel-connected heat exchanger assemblies one of which may comprise a plurality of exchangers connected in parallel.

The objects of this invention are accomplished, briefly, in the following manner: Certain key variables in a heat-transfer system are measured, and the information thus obtained, together with information about certain characteristics of the heat exchangers used, is fed into a computer which arithmetically combines the items of information in accordance with a certain mathematical formula, thereby to develop a signal proportional to the rate of change of the total heat transferred with a change in the fluid flow through one exchanger. This latter signal indicates the direction and amount of flow variation needed to produce the optimum heat transfer, and it is used to manipulate a flow controller to adjust the flow between the exchangers so as to bring about this optimum heat transfer.

A detailed description of the invention follows, taken in conjunction with the accompanying drawings, wherein.

Figure 1:
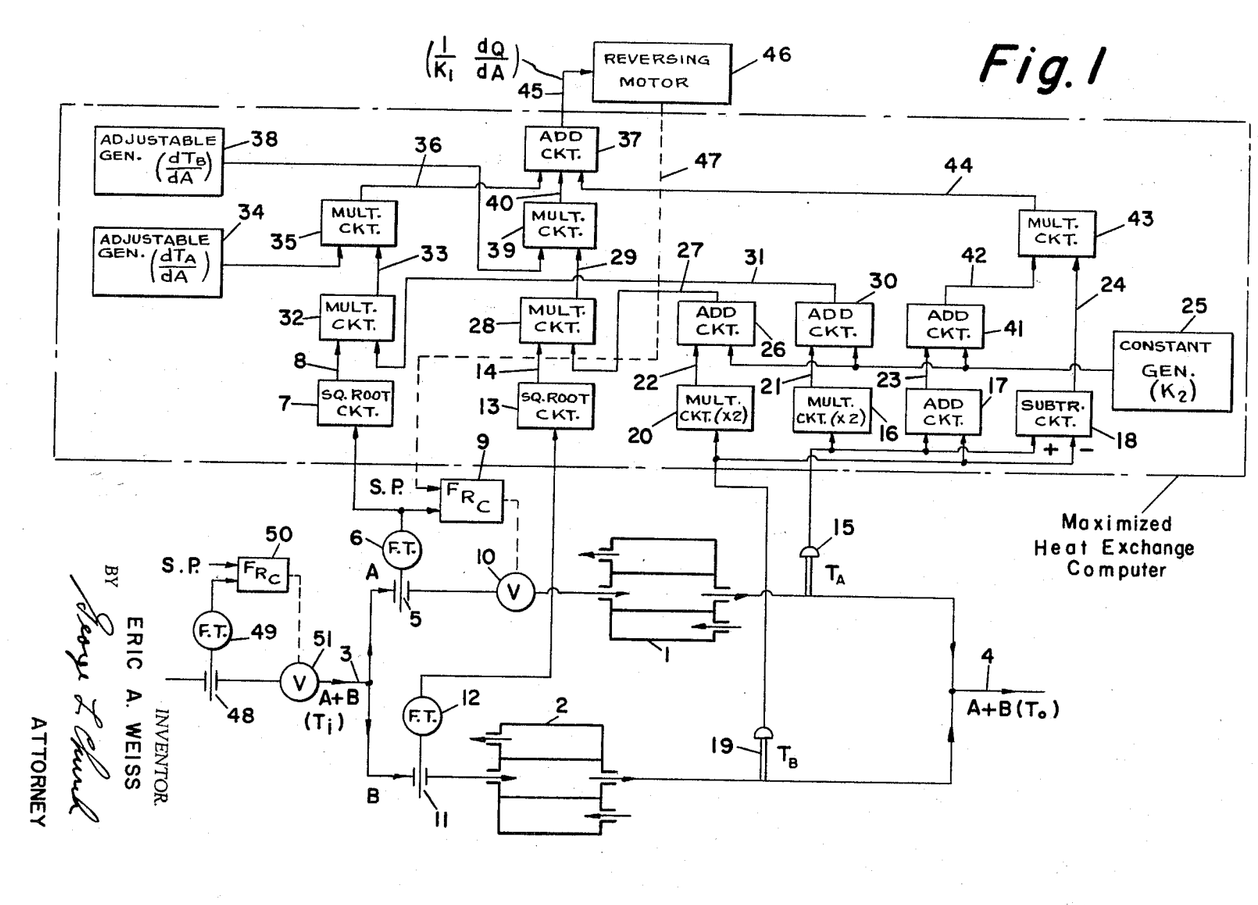
FIG. 1 is a schematic diagram of one embodiment of the invention.

Consider a pair of heat exchangers 1 and 2 connected in parallel on one side, as shown in FIG. 1. The fluid stream flowing in pipe 3 is divided into two branches, one branch (the upper) flowing through heat exchanger 1 and the other branch flowing through heat exchanger 2. Thereafter, the two streams are recombined into a single stream flowing in pipe 4. The mass flow rate through exchanger 1 is A and the mass flow rate through exchanger 2 is B. The total flow $A+B$ is a constant; how this total flow might be maintained constant will be explained hereinafter.

The heated-fluid flows on the other side of each exchanger (by means of which heat is supplied to the fluid flows A and B) are assumed to be constant in quantity, composition, and inlet temperature, but are not necessarily the same for the tow exchangers.

The problem is to determine the ratio of flow A to flow B required to obtain the maximum temperature of the total mixed stream $A+B$ after exchange, this latter temperature being denoted by $T_0$.

The temperature of the mixed stream $A+B$ in pipe 3 before exchange is $T_1$. The fluid outlet temperature of exchanger 1 is $T_A$ and that of exchanger 2 is $T_B$. The average specific heat for the material in exchanger 1 is $S_A$ and for the material in exchanger 2 is $S_B$; these specific heats are different because the temperatures $T_A$ and $T_B$ will in general be different from each other. Then, the expression for the total heat transferred is $$Q = S_A A (T_A - T_1) + S_B B (T_B - T_1) \quad (1)$$

The change in heat transferred for a change in flow division between the branches may be found by differentiating Q (above) with respect to A and using the condition that since $A+B$ is held constant, the variation of B with respect to A is equal and opposite. Therefore, while $$\frac{dA}{dA} + 1, \frac{dB}{dA} = -1$$

Using a suitable functional expression for the specific heat, for example $$S_A = \left(\frac{T_A + T_1}{2} + 670\right)\left(\frac{2.1 - \text{Specific gravity of fluid}}{2030}\right) \quad (2)$$

as presented in Industrial & Engineering Chemistry, 1927, page 824, we obtain, after differentiating Equation 1 above, and then rearranging, substituting for $S_A$ and $S_B$ and gathering terms, $$\frac{dQ}{dA} = K_1 \left[ T_A(K_2 + T_A + T_B) - T_B(K_2 + T_A + T_B) + A\frac{dT_A}{dA}(K_2 + 2T_A) + B\frac{dT_B}{dA}(K_2 + 2T_B) \right] \quad (3)$$

In Equation 3, $$K_1 = \frac{2.1 - \text{Specific gravity}}{(2)(2030)} \text{ and } K_2 = (2)(670)$$

In connection with Equation 2, it is noted that the constants 670 and 2030 are appropriate for petroleum fluids. For other fluids, an equation of the same form would apply, but the constant might be different.

Equation 3 contains the term $dT_A/dA$. This is a characteristic of the design construction and condition of heat exchanger 1 and of the nature and temperatures of both fluids flowing in it. It is experimentally determined (this may be done automatically, as will be described hereinafter) or calculated, and it represents the ratio between the incremental change in the outlet temperature of the fluid and the incremental change in flow which caused the temperature change. It may be thought of as the slope of the fluid outlet temperature vs. fluid flow characteristic of the exchanger. Since an increase in flow in an exchanger causes a decrease in the outlet temperature of the same exchanger, $dT_A/dA$ is negative. An expression $T_B/dB$ is defined in the same way for the exchanger containing flow B. Since the sum $A+B$ is held constant, any incremental change in B is equal and opposite to any incremental change in A. Consequently, $$dT_B/dA = -dT_B/dB$$

and $dT_B/dA$ is always positive. This latter term appears in Equation 3.

In accordance with a basic concept of differential calculus, Q (the total heat transferred) is a maximum when $dQ/dA=0$. Equation 3 is a formula for $dQ/dA$.

The various embodiments of the present invention involve measuring the parameters of the formula for $Q/dA$, Equation 3 above, or a simplification (given hereinafter) of this formula, and systematically adjusting flow A or flow B, or both, to bring $dQ/dA$ to zero. This maximizes or optimizes Q, the total heat transferred.

Refer again to FIG. 1. This figure is a schematic representation of a first embodiment of this invention. A flowmeter 5 is connected into the (upper) branch line leading to reat exchanger 1, to measure the flow A, a flow transmitter 6 being connected to the flowmeter 5 to indicate the actual flow, as well as to transmit the flow measurement to other units. It is assumed, for purposes of explanation, that flowmeter 5 is of the so-called orifice type, although it could be of the turbine type, or other suitable type. Orifice-type flowmeters give indications proportional to the square of the volume flow rate, so to produce a voltage (signal) proportional to A, the output of flow transmitter 6 is fed into a square root circuit 7, which extracts the square root of the signal fed thereto. Thus, the output 8 of the circuit 7 represents A, the flow rate through heat exchanger 1. Of course, if some other type of flowmeter were used at 5, the square root circuit 7 would not be needed.

Although orifice-type flowmeters give indications proportional to the square of the volume flow rate, the volume flow rate is proportional to the mass flow rate for a material of fixed specific gravity. Under the conditions illustrated in FIG. 1, the specific gravity is approximately constant, so it may be said that the output 8 of circuit 7 is substantially proportional to the mass flow rate through heat exchanger 1.

In general, it may be said that the flow rates referred to (in the theory on which this invention is based) are mass flow rates, so the physical embodiment of the invention must provide measuring means which will determine this rate, to a precision appropriate to the situation and to the results desired. While many common flowmeters (for example, orifice-plate types) actually measure volume flow rates, for small temperature changes in many commercial liquids, volume flow rates are directly proportional to mass flow rates. However, for increased precision, volume flow rate measurements may be corrected to mass flow rates by using the temperature of the flowing stream in a calculation. This correction may be automatically made within the flowmeter, or it may be included in the control computations as previously described.

If the invention is applied to heat exchangers involving gases or vapors, orifice-plate measurements must be corrected for the pressure of the flowing stream, as well as for its temperature.

The flow A is regulated by a flow recording controller 9 having a mechanically-adjustable set point "S.P." The flow transmitter 6 feeds its signal into controller 9. The flow A to heat exchanger 1 passes through a flow control valve 10. Controller 9 controls or operates valve 10 (this control being represented by a dotted-line connection) to maintain flow A at the rate determined by the adjustment of the set point of controller 9. How this set point is automatically adjusted will be detailed hereinafter.

A flow meter 11, which may be an orifice-type meter similar to flowmeter 5, is connected into the (lower) branch line leading to heat exchanger 2, to measure the flow B, a flow transmitter 12 being connected to flowmeter 11. The output of flow transmitter 12 is fed into a square root circuit 3, which extracts the square root of the signal fed thereto. The output 14 of the circuit 13 is approximately proportional to B, the mass flow rate through heat exchanger 2.

The fluid outlet temperature $T_A$ of exchanger 1 is measured by means of a temperature-sensing element 15 (illustrated as a thermocouple, for example) coupled to the outlet side of exchanger 1. Element 15 produces a signal proportional to the fluid outlet temperature of exchanger 1. Although illustrated as a thermocouple, the temperature-sensing element 15 may be a resistane thermometer, or some other suitable type of temperature-sensing element. The output signal of element 15 is fed to a multiplication circuit 16, which multiplies it by two, and is also fed to an add circuit 17 and to a subtract circuit 18.

The fluid outlet temperature $T_B$ of exchanger 2 is measured by means of a temperature-sensing element 19 which is coupled to the outlet side of exchanger 2. Element 19, which is similar to element 15 previously described, produces a signal proportional to the fluid outlet temperature of exchanger 2. The output signal of element 19 is fed to a multiplication circuit 20, which multiplies it by two, and is also fed to the add circuit 17 and to the subtract circuit 18.

It should be apparent that the output 21 of circuit 16 is $2T_A$, and the output 22 of circuit 20 is $2T_B$. The add circuit 17 adds the two signals fed to its input, to produce an output 23 of $T_A+T_B$. The subtract circuit 18 subtracts the two signals fed to its input, to produce an output 24 of $T_A-T_B$.

A generator 25 generates a signal proportional to the constant $K_2$, defined hereinabove, and the signal from generator 25 is fed to an add circuit 26 along with the output 22 of circuit 20, to produce at the output 27 of circuit 26 a signal $K_2+2T_B$. This latter signal is fed to a multiplication circuit 28 along with the output 14 of square root circuit 13. The multiplication circuit 28 multiplies the two signals thus fed to its input, to produce an output 29 of $B(K_2+2T_B)$.

The $K_2$ signal from generator 25 is also fed to an add circuit 30 along with the output 21 of circuit 16, to produce at the output 31 of circuit 30 a signal $K_2+2T_A$. This latter signal is fed to a multiplication circuit 32 along with the output 8 of square root circuit 7. Circuit 32 multiplies the two signals fed to its input, to produce an output 33 of $A(K_2+2T_A)$.

Adjustable variable $dT_A/dA$ is fed into the computer by means of a manually set knob (set to the value of this variable) which controls an adjustable generator 34. The $dT_A/dA$ signal is fed to a multiplication circuit 35 along with the output 33 of circuit 32. Circuit 35 produces an output 36 of $$A\frac{dT_A}{dA}(K_2+2T_A)$$

This latter output is fed to a final add circuit 37.

Adjustable variation $dT_A/dA$ is fed into the computer by means of a manually set knob (set to the value of this variable) which controls an adjustable generator 38. The $dT_B/dA$ signal is fed to a multiplication circuit 39 along with the output 29 of circuit 28. Circuit 39 produces an output 40 of $$B\frac{dT_B}{dA}(K_2+2T_B)$$

This latter output is also fed to add circuit 37.

The $K_2$ signal from generator 25 is also fed to an add circuit 41 along with the output 23 of circuit 17, to produce at the output 42 of circuit 41 a signal $K_2+T_A+T_B$. This latter signal is fed to a multiplication circuit 43 along with the output 24 of subtract circuit 18. Circuit 43 produces an output 44 of $(T_A-T_B)(K_2+T_A+T_B)$. This latter output is also fed to add circuit 37.

The components 7, 13, 16, 17, 18, 20, 25, 26, 28, 30, 32, 34, 35, 37, 38, 39, 41, and 43 may be conventional and well-known electrical, mechanical, or pneumatic components, of the analog or digital type. Since the listed components perform an arithmetical combination (computation), they may be thought of as together comprising a computer.

The add circuit 37 adds together its three inputs 36, 40, and 44. By comparing the sum of such inputs with Equation 3 above, it may be seen that the (summed) output 45 of add circuit 37 is equivalent to or represents $$1/K_1 \, dQ/dA$$

Speaking broadly, this quantity (output 45) is applied to a mechanical transducer which adjusts the set point of the flow controller in one branch (this is done on flow A in FIG. 1).

The expression or formula for $dQ/dA$, Equation 3, is such that the second and third terms in the square brackets are always negative (since $dT_A/dA$ is always negative) and the first and fourth terms always positive. Therefore, if $dQ/dA$ is negative, to bring this differential quantity to zero the magnitude of the second and third terms should be decreased. This can be done by decreasing A (which will increase B and therefore decrease $T_B$). The foregoing provides information as to the proper control direction for flow A (with regard to the sign of $dQ/dA$) in order to bring $dQ/dA$ to zero, thereby to maximize the total heat transfer to the fluid flowing through exchangers 1 and 2.

The mechanical transducer which adjusts the set point "S.P." of the flow controller 9 of flow A is shown in FIG. 1 as a reversing motor 46, which is supplied by the output 45 of add circuit 37 and which mechanically adjusts the set point of controller 9, as schematically indicated by the dotted-line connection 47. The reversing motor 46 is a device which drives the flow controller 9 set point slowly in a direction to decrease flow A whenever $dQ/dA$ is negative, and while it is negative, and reverses to drive this set point slowly in a direction to increase flow A whenever $dQ/dA$ is positive, and while it is positive. The drive or mechanical adjustment of the set point will stop when $dQ/dA$ is zero, or close to zero.

The control system of FIG. 1 assumes that the total flow $A+B$ is maintained constant by some control means additional to that described up to this point. The only reason for placing this requirement on the control system is so that any changes imposed by the computer portion of the control system on flow A will be reflected in equal and opposite changes in flow B. One means for maintaining constant the total flow will now be described; this involves a flow control valve in the total stream pipe 3.

A flowmeter 48 is connected into line 3, to measure the total flow $A+B$, a flow transmitter 49 being connected to the flowmeter 48 to indicate the actual flow in line 3. The flow $A+B$ is regulated by a flow recording controller 50 having a manual set point adjustment "S.P." The flow transmitter 49 feeds its signal into controller 50.

The total flow $A+B$ passes through a flow control valve 51. Controller 50 controls or operates valve 51 (this control being represented by a dotted-line connection) to maintain the total flow $A+B$ substantially constant, and at the rate chosen by the operator (by manual adjustment of the set point of controller 50).

Alternatively, the constant total flow control might be accomplished with a flow control valve controlling flow B.

In either case, the controller would maintain the total flow $A+B$ constant, in spite of variations in flow A imposed by the automatic optimizing (maximizing) control system.

The requirement is that the total flow $A+B$ be constant in spite of variations in flow A imposed by the automatic optimizing control system. However, it is not necessary that flow $A+B$ be always unchanging with time. On the contrary, it is an object of the invention to optimize the heat transfer in spite of changes in the total flow $A+B$ occurring at intervals which are long with respect to the time constant of the heat exchange system. In this connection, it is pointed out that the term "heat exchange system" includes the heat exchangers themselves, and also the control system associated with them. In most cases, the time constant of the heat exchangers would dominate the time constant of the "heat exchange system."

Optimization of heat transfer will not necessarily be achieved when there are changes in the total flow $A+B$ occurring at intervals which are short with respect to the time constant of the heat exchange system.

Equation 3 may be simplified by observing that $K_2=1340$, while in such operations $T_A$ and $T_B$ will typically be in the range of 100 to 400. Therefore, it can be said that the parenthetical parts of the four terms in Equation 3 are all approximately equal. That is to say, $$(K_2+T_A+T_B)=(K_2+2T_A)=(K_2+2T_B)$$

With this approximation, $$\frac{dQ}{dA}=0=T_A-T_B+A\frac{dT_A}{dA}+B\frac{dT_B}{dA} \qquad (4)$$

Figure 2:
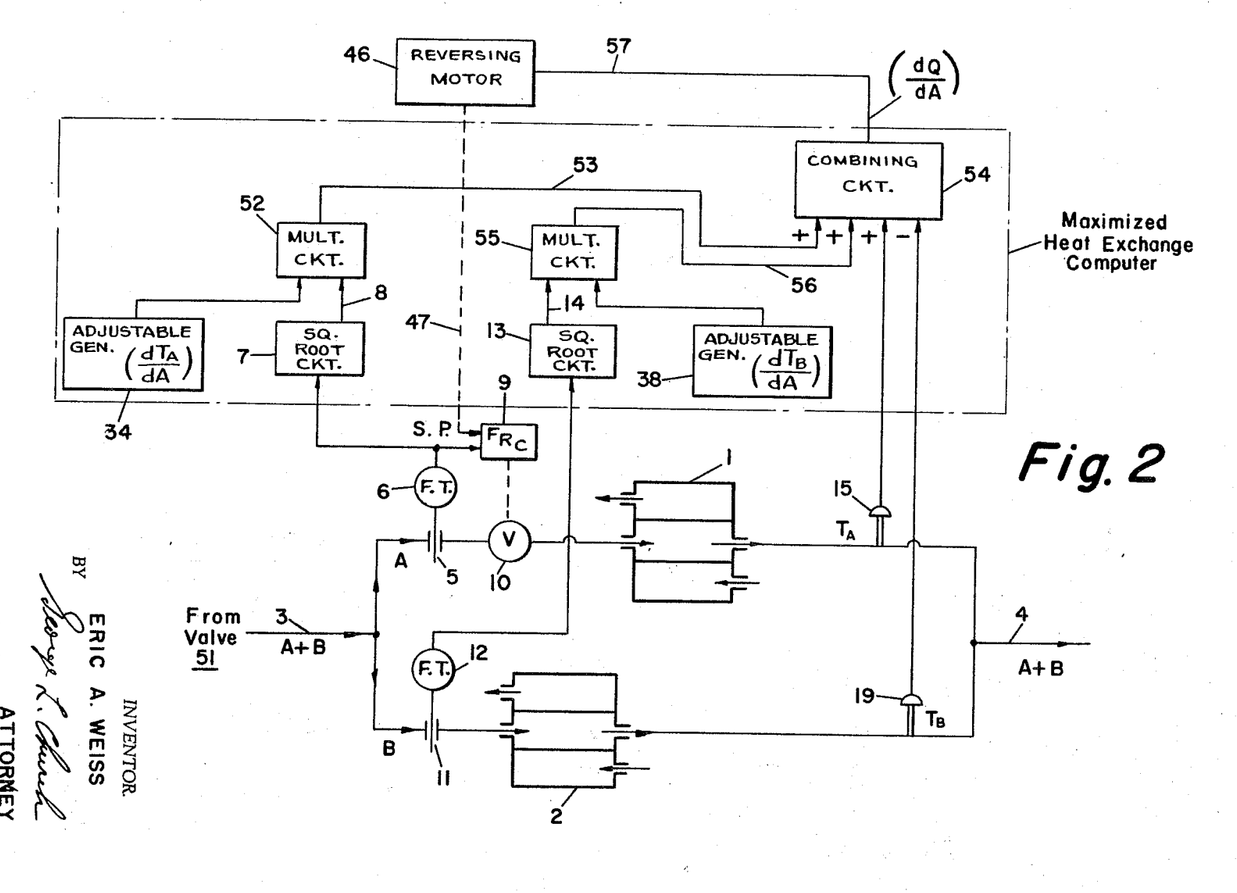
FIG. 2 is a similar diagram of another embodiment.

Refer now to FIG. 2. This figure is a schematic representation of a second embodiment of the invention, illustrating a control system which mechanizes Equation 4. In FIG. 2, elements the same as those in FIG. 1 are denoted by the same reference numerals.

Just as in FIG. 1, the output 8 of the circuit 7 represents flow A. This output is fed to a multiplication circuit 52 along with the $dT_A/dA$ signal from adjustable generator 34. Circuit 52 produces an output 53 of $$A\frac{dT_A}{dA}$$

This latter output is fed in a positive sense to a combining circuit 54.

As in FIG. 1, the output 14 of the circuit 13 represents flow B. This output is fed to a multiplication circuit 55 along with the $dT_B/dA$ signal from adjustable generator 38. Circuit 55 produces an output 56 of $$B\frac{dT_B}{dA}$$

This latter output is fed in a positive sense to circuit 54.

The $T_A$ signal from temperature-sensing element 15 is fed in a positive sense to circuit 54. The $T_B$ signal from temperature-sensing element 19 is fed in a negative sense to circuit 54.

From an examination of Equation 4 above, it can be seen that the four signals fed to circuit 54 correspond, respectively, to the four terms on the right-hand side of this equation. The combining or summation circuit 54 alegbraically combines these four signals to produce an output 57 which is equivalent to or represents $dQ/dA$, according to the simplification for approximation given in Equation 4. The output 57 is supplied to the reversing motor 46, which mechanically adjusts the set point of conroller 9 for flow A. Just as in FIG. 1, the motor 46 drives the flow controller 9 set point in such a direction as to bring the $dQ/dA$ signal at 57 to zero, or close to zero.

Comparing FIG. 1 with FIG. 2, it may be seen that the system of FIG. 2 provides a notable simplification of computing components.

In both FIGS. 1 and 2, $dT_A/dA$ and $dT_B/dA$ were assumed to be determined by calculation or measurement, and were assumed to be put into the computer as an adjustable constant, for example, as a knob setting of respective generators 34 and 38. While this will in general be satisfactory, in some cases variations in the heat exchanger characteristics, or in the fluids involved, may be frequent enough to justify an automatic determination of $dT_A/dA$ and $dT_B/dA$. Broadly speaking, this automatic determination may be effected by measuring the temperature difference across an exchanger and the flow through it, and deliberately introducing a small variation in the flow.

Figure 3:
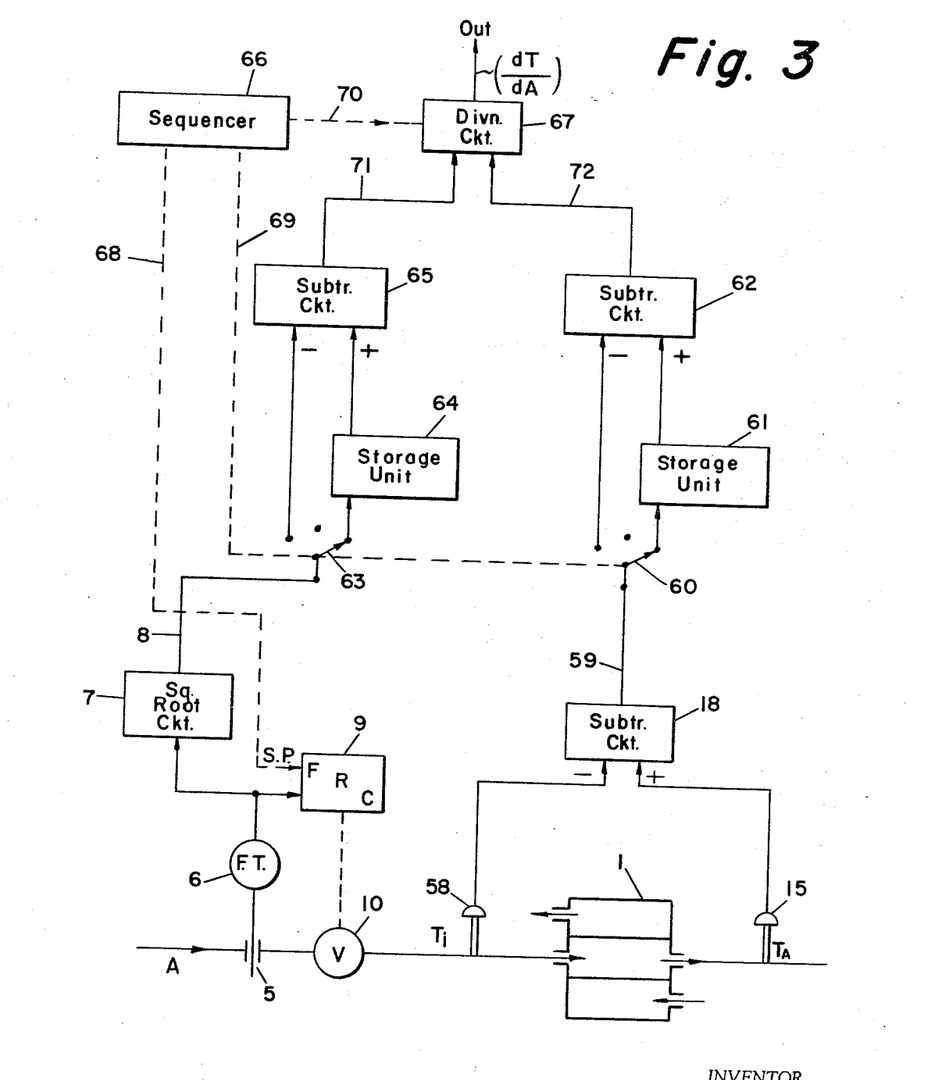
FIG. 3 is a schematic diagram of a system for automatically determining heat exchanger characteristics.

FIG. 3 is a schematic representation of a configuration whereby the automatic determination is accomplished. In FIG. 3, a flow controller 9, fed from a flowmeter 5 by way of flow transmitter 6, controls a valve 10 in the branch flow line through heat exchanger 1, to maintain a constant flow rate A. In the configuration of FIG. 3, the set point of flow controller 9 is adjustable in response to an impulse supplied thereto from a sequencer 66. A temperature-sensing element 58 measures the temperature $T_i$ of the fluid before the exchanger 1, and temperature-sensing element 15 measures the temperature $T_A$ of the fluid after the exchanger. The output signals of elements 5 and 58 are fed to a subtract circuit 18, to form an output 59 $T_A - T_i$. This latter signal is normally fed by way of the movable arm of a switch 60 to a storage unit 61, which stores its value. Storage unit 61 is of a type, e.g., a magnetic drum or a capacitor, which stores the signal fed thereto in permanent yet erasable form; that is to say, the signal is permanent until it is erased and replaced by a new signal. For a digital system, the stored signal would be in the form of a number; for an analog system, the stored signal would be in the form of a value. The signal stored in unit 61 is fed to a subtract circuit 62.

The output 8 of the square root circuit 7 again represents flow A. This latter signal is normally fed by way of the movable arm of a switch 63 to a storage unit 64, which stores its value. Unit 64 may be similar to unit 61, described previously. The signal stored in unit 64 is fed to a subtract circuit 65.

A sequencer 66 is coupled to the set point control of controller 9, to switches 60 and 63, and to a division circuit 67, as indicated by the dotted-line connections 68, 69, and 70 respectively. At wide intervals (perhaps every hour or more), sequencer 66 sends out a series of electrical, pneumatic, or mechanical impulses which (by way of connection 68) change the flow controller 9 set point slightly (thereby to change slightly the flow through heat exchanger 1) and also (by way of connection 69) operate switches 60 and 63 to disconnect the inputs 59 and 8 from their respective storage units.

Some time later, after the new flow and temperature conditions have become stabilized (which later time may be determined either by elapsed time or by flow and temperature measurement), sequencer 66 impulses switches 63 and 60 to their left-hand contacts, wherein the new signal A is fed to subtract circuit 65 and the new signal $T_A - T_i$ is fed to subtract circuit 62. It will be noted that the other input to circuit 65 is obtained continuously from storage unit 64, and the other input to circuit 62 is obtained continuously from storage unit 61. At the same time that switches 63 and 60 are thus operated to their left-hand contacts, impulses sent out from sequencer 66 by way of connection 70) result in actuation of division circuit 67.

Using the subscripts 1 for conditions before the change in flow and 2 for conditions after the change in flow, the subtract circuit 65 produces an output 71 of $A_1 - A_2$, since $A_1$ is fed continuously to circuit 65 from storage unit 64 and $A_2$ is fed to this same circuit when switch 63 is on its left-hand contact. The subtract circuit 62 produces an output 72 of $(T_{A1} - T_{i1}) - (T_{A2} - T_{i2})$, since $(T_{A1} - T_{i1})$ is fed continuously to circuit 62 from storage unit 61 and $(T_{A2} - T_{i2})$ is fed to this same circuit when switch 60 is on its left-hand contact.

Division circuit 67 produces the quotient $$\frac{(T_{A1} - T_{i1}) - (T_{A2} - T_{i2})}{A_1 - A_2}$$

which is $dT_A/dA$, since $T_{i1}$ ordinarily is equal to $T_{i2}$.

After the signal $dT_A/dA$ has been generated by circuit 67 in the above manner, sequencer 66 operates to restore the flow and all connections to normal. By adding complexity to the sequencer, another measurement of $dT_A/dA$ could be made as a consequence of this return to normal.

The extension of the configuration of FIG. 3 to the automatic measurement of $dT_B/dA$ would appear to be obvious.

The automatic measurement configuration of FIG. 3 may be added to either the computer of FIG. 1 or the computer of FIG. 2, by allowing the $dT_A/dA$ and $dT_B/dA$ signals (obtained by the FIG. 3 scheme) to reset their corresponding adjustable variables (at 34 and 38 in FIGS. 1 and 2) after every series of sequencer impulses. It will be necessary, with this combined arrangement, to cause the sequencer 66 to disable the optimizing computers of FIGS. 1 and 2 while testing for $dT_A/dA$, in order to avoid undesirable interactions.

In connection with the control systems of FIGS. 1 and 2, previously described, it was stated that there is required some form of additional control means, for maintaining the total flow $A+B$ constant in spite of variations imposed by the computer portion of the control system on flow A. However, the control scheme of this invention can be applied to situations in which the flow $A+B$ is not held constant, but is allowed to vary from time to time, so long as any variation imposed by the control scheme on flow A is reflected in a variation in flow B which is equal in size (not percentage) and opposite in sign. That is, for every barrel per hour of increase caused by the control scheme in flow A, flow B must be decreased by a barrel, and vice versa. To state this in another way, in situations in which the total flow $A+B$ varies from time to time, even at intervals which are short with respect to the heat exchange system time constant, the control scheme previously described will function properly if means are provided to vary flow B equally and oppositely to control system-imposed variations of A.

Figure 4:
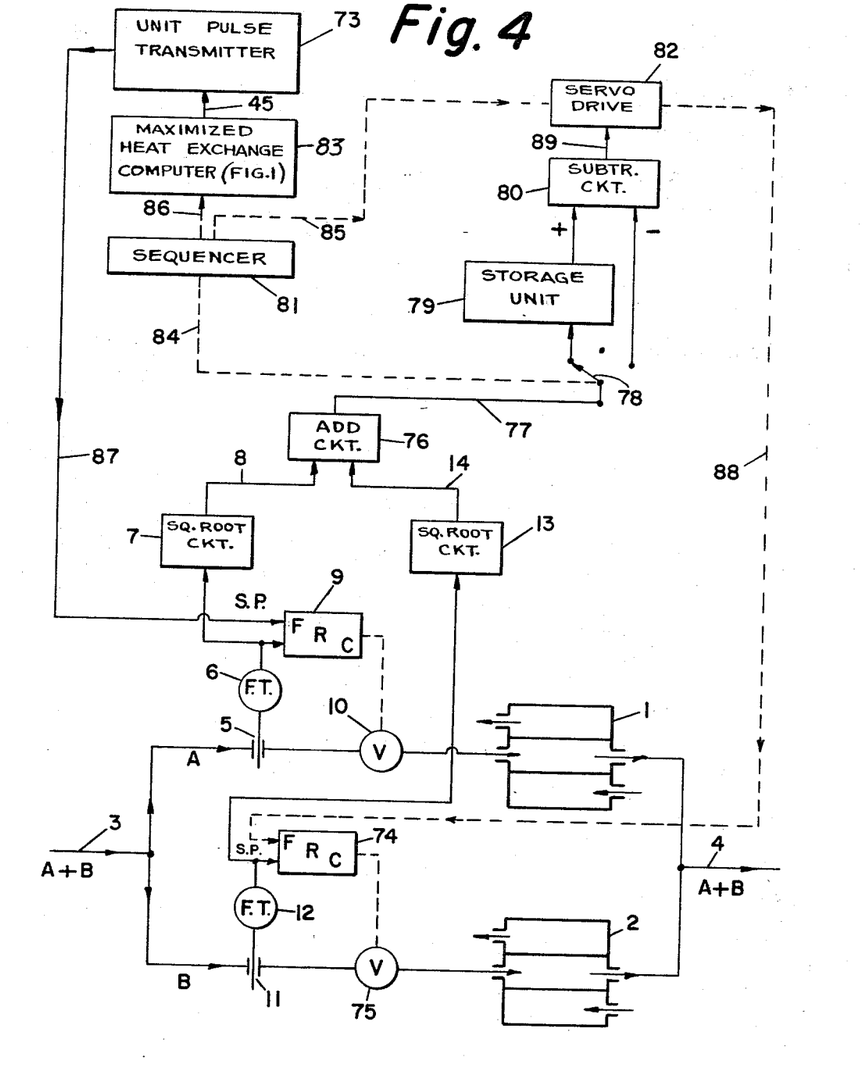
FIG. 4 is a schematic diagram of a sequenced type of control system.

The means referred to in the preceding sentence can be provided by causing the optimizing action to proceed in steps, according to fixed sequence. Refer now to FIG. 4, which is a schematic illustration of a maximized heat exchange computer arranged to handle variable total flow rates. In FIG. 4, elements the same as those previously described are denoted by the same reference numerals.

In FIG. 4, the flow recording controller 9 has an electrically-adjustable set point "S.P.," which is adapted to be changed by a fixed amount in response to a pulse supplied to this set point control from a unit pulse transmitter 73. The direction of change of this set point depends upon the relative sense of the pulse supplied from transmitter 73.

The flow B is regulated by a flow recording controller 74 having a mechanically-adjustable set point "S.P." The flow transmitter 12 feeds its signal into controller 74. The flow B to heat exchanger 2 passes through a flow control valve 75. Controller 74 controls or operates valve 75 (this control being represented by a dotted-line connection) to maintain flow B at the rate determined by the adjustment of the set point of controller 74. How this set point is automatically adjusted will be detailed hereinafter.

Just as in FIG. 1, the output 8 of the circuit 7 represents flow A, while the output 14 of the circuit 13 represents flow B. These two flows A and B are supplied to an add circuit 76, wherein the measurements are added to provide an output 77 of $A+B$. This output signal $(A+B)$ at 77 is fed by way of the movable arm of a switch 78 (when this switch arm is on its left-hand contact, as illustrated in FIG. 4) to a storage unit 79, which stores its value. Storage unit 79 may be similar to storage unit 61 in FIG. 3. The signal stored in unit 79 is fed to a subtract circuit 80.

A sequencer 81 is coupled to switch 78, to a servo drive circuit 82, and to a maximized heat exchange computer 83, as indicated by the dotted-line connections 84, 85, and 86, respectively.

The heat exchange computer 83 would be arranged internally as shown in FIG. 1 (and would be supplied with temperature and flow measurements, as in this latter figure), except that the computer output would not be to the reversing motor drive 46 of FIG. 1, but would be instead to the unit pulse transmitter 73, as shown in FIG. 4. The unit pulse transmitter 73 can supply pulses to the set point control of controller 9 by way of a connection 87.

After the total flow $A+B$ has been measured and stored in storage unit 79, sequencer 81 sends out impulses which (by way of connection 84) operate switch 78 to disconnect the $A+B$ signal from unit 79, and which (by way of connection 86) activate the computer 83.

The computer 83, when activated, operates as previously described (in connection with FIG. 1) to develop an output 45 proportional to $dQ/dA$, and this output is fed to unit pulse transmitter 73. If $dQ/dA$ is not zero, pulse transmitter 73 produces a pulse of a particular sense which depends upon the calculated sign (positive or negative) of $dQ/dA$, as calculated by computed 83. The unit pulse transmitter 73 transmits this produced pulse to the set-point control of controller 9 in stream A.

When computer 83 is activated, the unit pulse transmitter 73 changes the set point of flow controller 9 by a fixed amount in the appropriate direction, according to the calculated sign of $dQ/dA$. This change of the set point is effected by means of the pulse transmitted from transmitter 73 to controller 9, by way of connection 87. Of course, this change of the set point of controller 9 results in a new value for flow A.

After the pulse is transmitted to controller 9, sequencer 81 disconnects (deactivates or deenergizes) computer 83, and operaes switch 78 to its right-hand contact, thereby to switch the (new) $A+B$ signal to subtract circuit 80. Also, by way of connection 85, sequencer 81 at this time turns on the servo drive 82. The mechanical output of servo drive 82 is connected to the set-point control of the flow controller 74 in stream B, as indicated by the dotted-line connection 88.

At this juncture, storage unit 79 contains the old value of $A+B$; this signal is fed continuously to subtract circuit 80. The subtract circuit 80 now subtracts from this the new value of $A+B$ (which is fed to this circuit when switch 78 is on its right-hand contact). The difference (output 89 of circuit 80), which is the change in flow A, is fed to the input of servo drive unit 82. The input signal to servo drive 82 causes this servo drive to mechanically adjust the set point of the flow B controller 74 so as to change flow B and bring this difference (output 89 of circuit 80) to zero. When this latter difference is zero (or after a set time), sequencer 81 turns off the servo drive 82 and operates switch 78 back to its left-hand contact, thereby to switch the $A+B$ signal back to storage unit 79, and start the cycle again.

Summarizing, the FIG. 4 arrangement will provide an optimum (maximum heat transferred) flow division even when the total flow varies, by means of the following operating steps: (1) measuring and storing the initial (or original) value of total flow $A+B$, (2) calculating $dQ/dA$, (3) setting flow A a unit amount toward zero $dQ/dA$, (4) measuring the new total flow $A+B$, (5) comparing is new flow with the old or original, and (6) adjusting flow B to make the new flow $A+B$ equal the old flow $A+B$. Then, the cycle is repeated, starting with step (1) above.

Although there has previously been described a heat exchange system wherein the temperature of the main stream is being raised, it will be understood that the same control system, with certain obvious modifications of the mathematics, will also maximize the heat transfer (to minimize the outlet temperature) in an arrangement wherein a stream is being cooled with parallel-connected exchangers.

The description up to this point has dealt with only a single pair of parallel-connected heat exchangers. It will now be explained how a control system or control scheme which optimizes the heat exchange of a pair of parallel-connected heat exchangers can be extended and combined to yield a system which can optimize the heat exchange of any number of parallel-connected heat exchangers.

Figure 5:
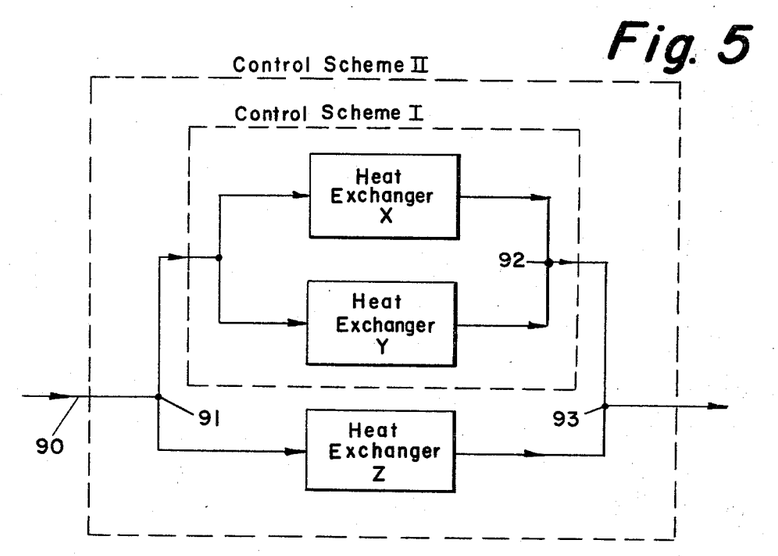
FIGS. 5–10 illustrate various arrangements of three parallel-connected heat exchangers.

Consider a system of three parallel-connected heat exchanges X, Y, and Z which are piped together as shown in FIG. 5, with exchangers X and Y being paired so that the total stream at 90 is first split at 91 between exchangers X and Y combined and Z separate, and the output streams from exchangers X and Y are joined together at 92 before being joined at 93 to the output of exchanger Z. In this case, it is clear that any of the control schemes previously disclosed (in FIGS. 1, 2, or 4) can be applied to the control of the exchanger pair X and Y, and such scheme will divid the flow between them to optimize the heat exchanger of this pair alone, for the particular total flow they are handling. Now, an additional control scheme (any of those disclosed in FIGS. 1, 2, or 4 above) can be applied to the "pair" made up of Z and X plus Y, where the combination of X plus Y is treated as a single exchanger.

The foregoing is illustrated in FIG. 5, wherein "internal" Control Scheme I (indicated by a dotted-line enclosure) deals with the exchanger pair X and Y, and "external" Control Scheme II (also indicated by a dotted-line enclosure) deals with the exchanger "pair" Z and X plus Y treated as a single exchanger.

In the manner just described, by adding an "external" control scheme for each added heat exchanger, the control schemes described hereinabove (in connection with FIGS. 1, 2, and 4) as applying to a pair of exchangers can be extended to control any number of exchangers in parallel.

In practice, the time constants of the several control loops and the associated exchangers must be selected to have appropriate relationships, to avoid instabilities in operation.

FIG. 5 illustrates the three exchangers as piped together in a somewhat unusual way, this having been done mainly to illustrate the idea of the grouping of X with Y and then this pair with Z. Ordinarily, a control scheme must conform to a piping system as it exists, and it is possible that exchangers will be so piped together that there is no natural grouping of exchangers into pairs with clearly defined points of measurement of the combined streams. However, most common piping systems will exhibit pairing arrangements in which the necessary measuring points are accessible. Examples of some common piping systems are shown in FIGS. 6, 7, and 9.

Figure 6:
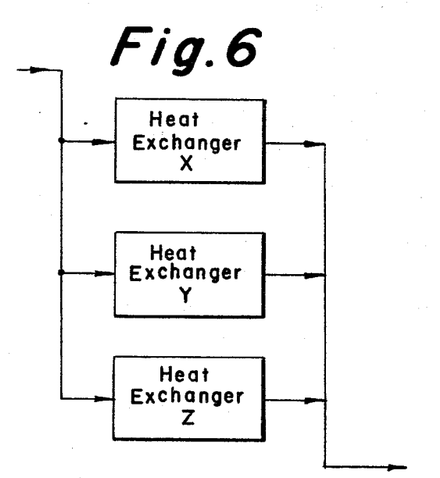

In FIG. 6, exchangers X and Y would be grouped together as a pair and a first control scheme applied to this pair; then a second control scheme would deal with the exchanger "pair" Z and X plus Y treated as a single exchanger.

Figure 7:
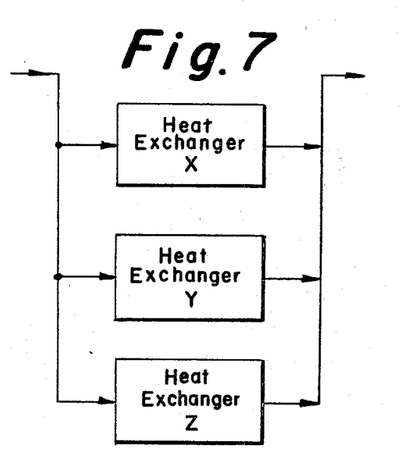

In FIG. 7, exchangers Y and Z would be grouped together as a pair and a first control scheme applied to this pair; then a second control scheme would deal with the exchanger "pair" X and Y plus Z treated as a single exchanger.

Figures 8, 9:
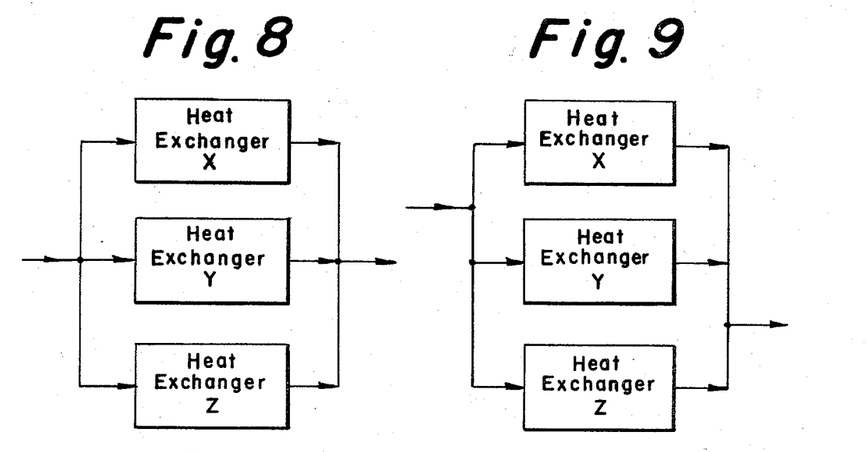

In FIG. 9, exchangers X and Y would be grouped together as a pair and a first control scheme applied to this pair; then a second control scheme would deal with the exchanger "pair" Z and X plus Y treated as a single exchanger.

However, it is possible that a set of parallel-connected heat exchangers may be so piped together that there is no apparent grouping into a first pair followed by successive additions of single exchangers. This "apparent grouping" is based on the ability to measure the necessary flows and temperatures. While the control schemes of FIGS. 1, 2, and 4 require only the measurement of the separate flow through each of the members of a pair of parallel-connected exchangers (never the total flow through both members), and only the measurement of the temperatures of the separate output streams from the two exchangers of the pair (never the temperature of the output stream after blending), these values of total flow and blended temperature are needed when a pair of exchangers is to be treated as a single exchanger. Since the streams to and from each exchanger must be separated at least at the point of entry to and exit from each exchanger, it will always be possible to measure the entrance and exit temperatures, and the rate of flow of each separate stream, for each separate exchanger. The difficulty will arise in cases where the joined piping runs preceding or following an exchanger pair are both too short to permit a good measurement of the total flow rate for the pair, or where the joined piping run following an exchanger pair is too short to provide a good blending of the two exchanger outputs, so that a blended temperature cannot be measured before the stream from the third exchanger is mixed in. FIG. 8 is one symbolic diagram of such an assembly where the connections to and from exchangers X, Y, Z are substantially at single points so that no "pair" measurements of flow and temperature can be made. Note that the input temperature for a battery of parallel-connected exchangers is the same for all exchangers, and is generally accessible for measurement.

Figure 10:
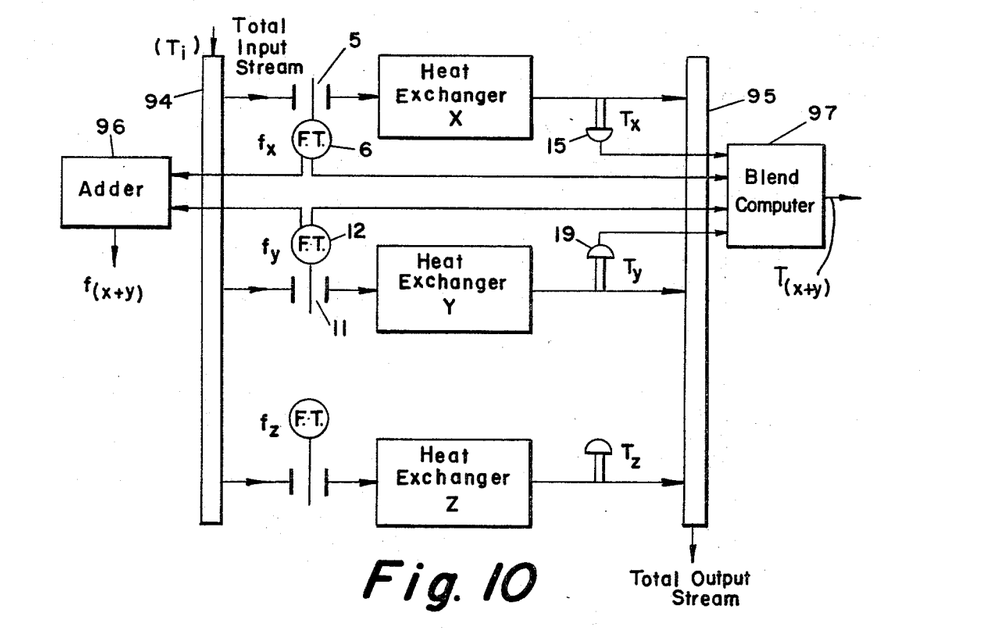

In cases of the type referred to in the preceding paragraph, recourse may be had to automatic calculation, to obtain the unmeasurable total flows or blended temperatures from the individual flows and temperatures. This is illustrated in FIG. 10. In FIG. 10, the piping is such (see the large-diameter input manifold pipe 94 and the large-diameter output manifold pipe 95) that it is impossible to obtain good direct measurements of the total flow rate $f_{(X+Y)}$ for the pair of heat exchangers X and Y, or of the blended temperature $T_{(X+Y)}$ of this same pair of exchangers. In FIG. 10, $T_1$ represents the temperature of the total input stream, $f_X$, $f_Y$, and $f_Z$ represent the measured flow rates through exchangers X, Y, and Z, and $T_X$, $T_Y$, and $T_Z$ represent the measured temperatures of the output streams from exchangers X, Y, and Z. The flow transmitter 6, coupled to flowmeter 5, transmits the measured flow rate $f_X$ to a simple computer 96 (e.g., an adder). Similarly, the flow transmitter 12, coupled to flowmeter 11, transmits the measured flow rate $f_Y$ to computer 96. The computer 96 adds the measurements $f_X$ and $f_Y$ to give the total flow rate $f_{(X+Y)}$ through exchangers X and Y combined.

The flow transmitters 6 and 12 also transmit their respective flow rate measurements to a somewhat more complex blend computer 97. The temperature-sensing element 15 supplies its temperature measurement $T_X$ to computer 97. Similarly, the temperature-sensing element 19 supplies its temperature measurement $T_Y$ to computer 97. The computer 97 combines the flow rate and temperature measurements supplied to it (with stored information concerning the properties of the flowing material) into a calculated value of the temperature $T_{(X+Y)}$ of the blended output streams from exchangers X and Y.

The devices 96 and 97 thus will provide the flow and temperature information required to treat the pair of exchangers X and Y as a single exchanger, for the purpose of determining the optimum (for maximum transfer of heat) flow division between these two and exchanger Z.

Figure 11:
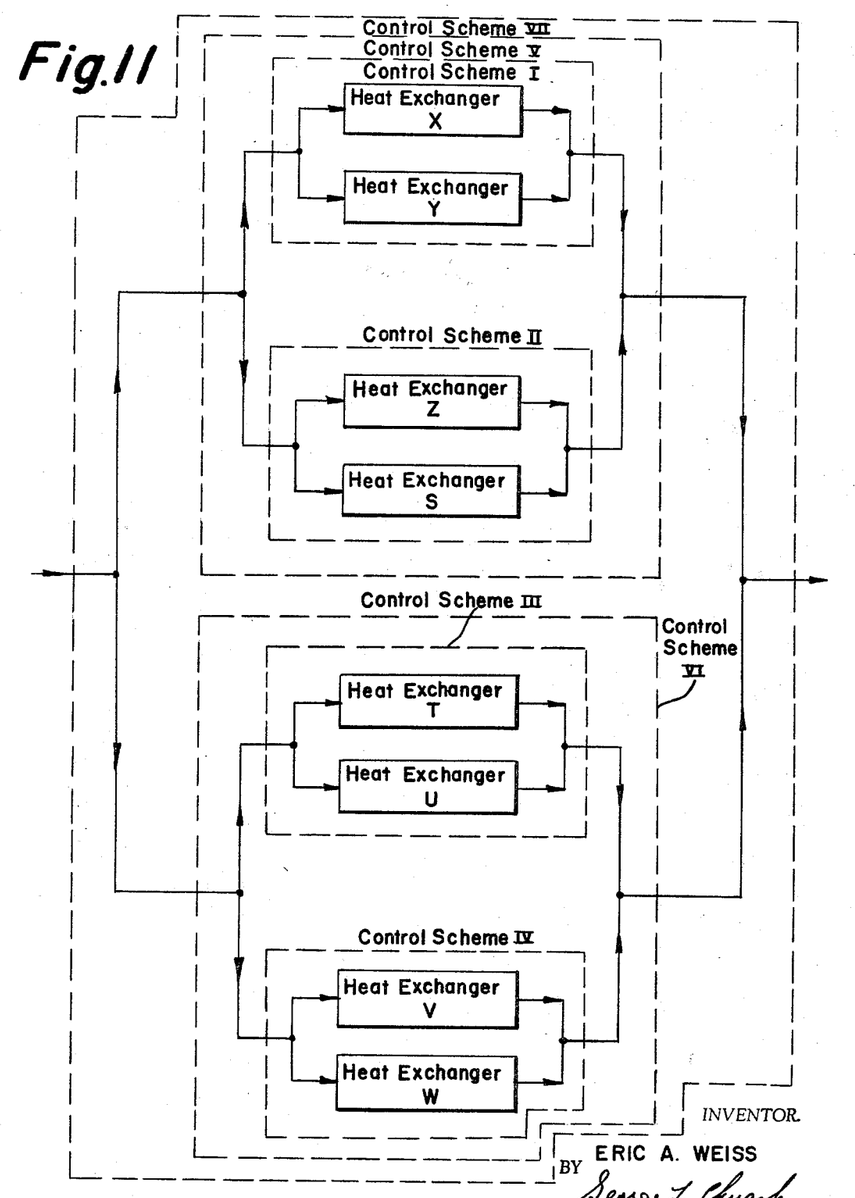
FIG. 11 illustrates an arrangement of eight parallel-connected heat exchangers.

The arrangements described previously (in connection with FIGS. 5–10), where two exchangers are paired and then each additional exchanger is added as a new member of a pair, will work for any number of exchangers, and will require $(n-1)$ control schemes, where $n$ is the number of parallel-connected exchangers. Other arrangements are possible, however. One such is illustrated in FIG. 11, wherein eight parallel-connected exchangers are controlled first by pairing the small (Control Schemes I, II, III, and IV), then by pairing the pairs (Control Schemes V and VI), and then by pairing the pairs of pairs (Control Scheme VII). This requires the same number of control schemes as would be required by the add-one-at-a-time plan, but offers some advantage in the depth of nesting of control schemes. That is to say, in FIG. 11 there are only three levels of control schemes ("inner" Schemes I, II, III, and IV; "middle" Schemes V and VI; "outer" Scheme VII), whereas had the add-one-at-a-time plan been utilized, there would have been seven such levels. Since the problem of stability of nested control schemes is related to the depth of nesting, the plan of FIG. 11 may be preferable when more than three parallel-connected exchangers are involved.

In considering the number of control schemes or control systems required for a set of parallel-connected exchangers, the possibility of time-sharing all or part of the computational facilities should not be overlooked. A switching scheme could be employed to successively switch parts of the computing equipment (e.g., the maximized heat exchanger computers of FIGS. 1 or 2) from one control scheme to another, so that a single computer could service several control schemes.

The invention claimed is:

1. A control system for maximizing the total heat transferred to a fluid flowing through two parallel-connected heat exchanger assemblies one of which may comprise a plurality of exchangers connected in parallel, said system comprising separate means for measuring the individual rate of flow through each exchanger assembly, means for measuring the fluid outlet temperature of each exchanger assembly, means combining, in accordance with a predetermined mathematical formula, the aforesaid measurements with the predetermined fluid outlet temperature vs. fluid flow characteristics of the two exchanger assemblies to develop a control signal proportional to the rate of change of the total heat transferred with a change in the fluid flow through the first exchanger assembly, and means acting in response to said control signal for controlling the fluid flow through one of said exchanger assemblies.

2. System as set forth in claim 1, wherein the fluid flow through said first exchanger assembly is controlled in response ot said control signal.

3. System as set forth in claim 1, wherein the direction of the control of the fluid flow through said one exchanger assembly is such as to cause the value of said control signal to approach zero.

4. System as set forth in claim 2, wherein the direction of the control of the fluid flow through said first exchanger assembly is such as to cause the value of said control signal to approach zero.

5. A control system for maximizing the total heat transferred to a fluid flowing through two parallel-connected heat exchanger assemblies one of which may comprise a plurality of heat exchangers connected in parallel, said system comprising means for measuring the rate of flow A through the first exchanger assembly, means for measuring the rate of flow B through the second exchanger assembly, means for measuring the fluid outlet temperature $T_A$ of the first exchanger assembly, means for measuring the fluid outlet temperature $T_B$ of the second exchanger assembly, means combining the aforesaid measurements with the predetermined fluid outlet temperature vs. fluid flow characteristics of the two exchanger assemblies in accordance with the following formula thereby to develop a resultant signal for control purposes:

$$T_A(K_2+T_A+T_B)-T_B(K_2+T_A+T_B)+$$
$$A\frac{dT_A}{dA}(K_2+2T_A)+B\frac{dT_B}{dA}(K_2+2T_B)$$

where $K_2$ is a constant appropriate to the fluid, and means controlling the fluid flow through one of said exchanger assemblies in response to said control signal.

6. A control system for maximizing the total heat transferred to a fluid flowing through two parallel-connected heat exchanger assemblies one of which may comprise a plurality of heat exchangers connected in parallel, said system comprising means for measuring the rate of flow A through the first exchanger assembly, means for measuring the rate of flow B through the second exchanger assembly, means for measuring the fluid outlet temperature $T_A$ of the first exchanger assembly, means for measuring the fluid outlet temperature $T_B$ of the second exchanger assembly, means combining the aforesaid measurements with the predetermined fluid outlet temperature vs. fluid flow characteristics of the two exchanger assemblies in accordance with the following formula, thereby to develop a resultant signal for control purposes:

$$T_A(K_2+T_A+T_B)-T_B(K_2+T_A+T_B)+$$
$$A\frac{dT_A}{dA}(K_2+2T_A)+B\frac{dT_B}{dA}(K_2+2T_B)$$

where $K_2$ is a constant appropriate to the fluid, and means controlling the fluid flow A through said first exchanger assembly in response to said control signal.

7. A control system for maximizing the total heat transferred to a fluid flowing through two parallel-connected heat exchanger assemblies one of which may comprise a plurality of heat exchangers connected in parallel, said system comprising means for measuring the rate of flow A through the first exchanger assembly, means for measuring the rate of flow B through the second exchanger assembly, means for measuring the fluid outlet temperature $T_A$ of the first exchanger assembly, means for measuring the fluid outlet temperature $T_B$ of the second exchanger assembly, means combining the aforesaid measurements with the predetermined fluid outlet temprature vs. fluid flow characteristics of the two exchanger assemblies in accordance with the following formula, thereby to develop a resultant signal for control purposes:

$$T_A(K_2+T_A+T_B)-T_B(K_2+T_A+T_B)+$$
$$A\frac{dT_A}{dA}(K_2+2T_A)+B\frac{dT_B}{dA}(K_2+2T_B)$$

where $K_2$ is a constant appropriate to the fluid, and means controlling the fluid flow through one of said exchanger assemblies, in response to said control signal, in such a direction as to cause the value of said control signal to approach zero.

References Cited
UNITED STATES PATENTS

| | | | |
|---|---|---|---|
| 2,761,284 | 9/1956 | Malick | 235—150.1 X |
| 2,976,234 | 3/1961 | Webber | 202—160 X |
| 3,079,079 | 2/1963 | Phister et al. | 235—150.1 |
| 3,150,064 | 9/1964 | Dobson | 202—160 X |
| 3,167,113 | 1/1965 | Kleiss | 235—150.1 X |
| 3,174,298 | 3/1965 | Kleiss | 137—98 X |

MALCOLM A. MORRISON, *Primary Examiner.*

I. KESCHNER, *Assistant Examiner.*